US009938708B1

(12) United States Patent
Peacock

(10) Patent No.: US 9,938,708 B1
(45) Date of Patent: Apr. 10, 2018

(54) APPARATUS FOR SECURING A TOILET TO A FLOOR

(71) Applicant: Emory Grant Peacock, Panama City Beach, FL (US)

(72) Inventor: Emory Grant Peacock, Panama City Beach, FL (US)

( * ) Notice: Subject to any disclaimer, the term of this patent is extended or adjusted under 35 U.S.C. 154(b) by 148 days.

(21) Appl. No.: 14/821,925

(22) Filed: Aug. 10, 2015

Related U.S. Application Data

(60) Provisional application No. 62/051,118, filed on Sep. 16, 2014.

(51) Int. Cl.
*E03D 11/00* (2006.01)
*E03D 11/16* (2006.01)
*F16B 2/10* (2006.01)
*F16B 2/06* (2006.01)
*F16B 2/00* (2006.01)

(52) U.S. Cl.
CPC .............. *E03D 11/16* (2013.01); *F16B 2/005* (2013.01); *F16B 2/065* (2013.01); *F16B 2/10* (2013.01)

(58) Field of Classification Search
CPC ....... E03D 11/135; E03D 11/14; E03D 11/16; F16B 2/065; F16B 2/14
USPC ........ 411/395, 408, 540; 403/256, 338, 388; 4/252.1, 252.3, 252.4, 594, 595, 661; 285/142.1, 387, 406, 412, 420, 56, 58
See application file for complete search history.

(56) References Cited

U.S. PATENT DOCUMENTS

| | | | | | |
|---|---|---|---|---|---|
| 928,523 | A | * | 7/1909 | Kelly | E03D 11/16 4/252.1 |
| 2,161,259 | A | * | 6/1939 | Lindsay | E01B 9/28 238/349 |
| 3,680,154 | A | * | 8/1972 | Stairs | E03D 11/16 4/252.1 |
| 3,747,887 | A | * | 7/1973 | Binkley | A47C 7/002 248/501 |
| 4,680,915 | A | * | 7/1987 | Bush | E06B 3/5481 248/504 |
| 6,944,994 | B2 | * | 9/2005 | Hendzel | F16M 7/00 248/500 |
| 7,089,604 | B2 | * | 8/2006 | Wright | E03D 11/135 4/252.1 |
| 9,103,106 | B1 | * | 8/2015 | Williams | E03D 11/16 |
| 9,359,754 | B2 | * | 6/2016 | Zhou | E03D 11/16 |

* cited by examiner

*Primary Examiner* — Erin Deery
*Assistant Examiner* — Nicholas Ros

(57) ABSTRACT

A clamp for securing a toilet to a floor that includes a body having a convex outer surface, a floor engagement portion, a toilet engagement portion, and at least one hole for receiving a screw to secure the clamp and toilet to the floor, with the hole angled to draw the clamp downward and towards the toilet.

19 Claims, 3 Drawing Sheets

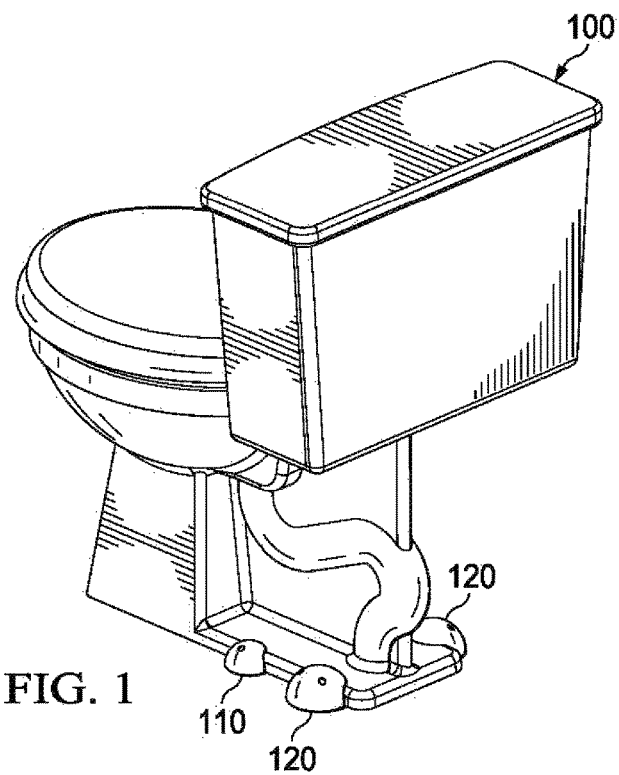
FIG. 1
FIG. 2
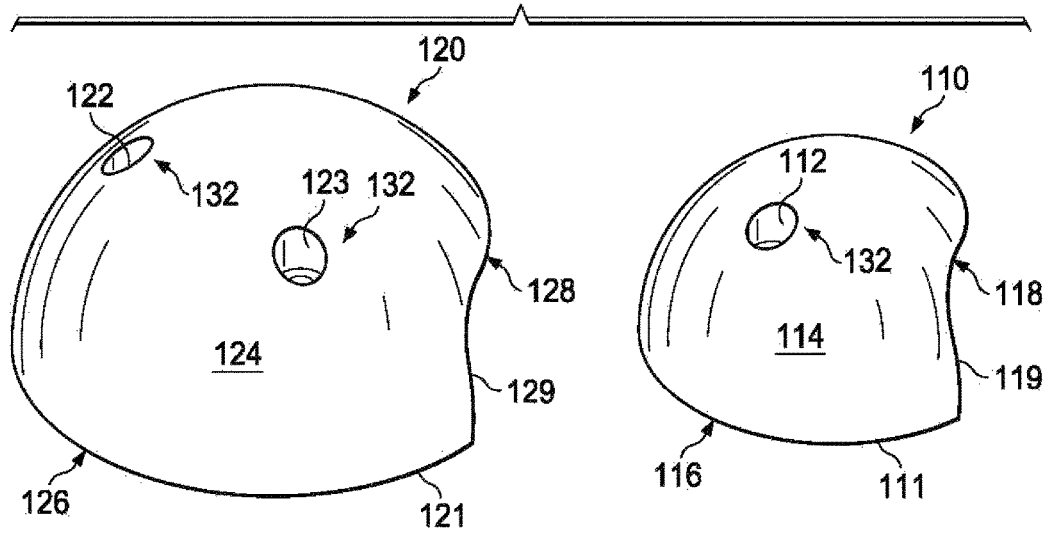

APPARATUS FOR SECURING A TOILET TO A FLOOR

CROSS-REFERENCE TO RELATED PATENTS

The present U.S. Utility Patent Application claims priority pursuant to U.S. Provisional Application Ser. No. 62/051,118, entitled, "CLAMP DEVICE THAT HOLDS A TOILET BOWL SECURELY TO THE FLOOR WITH OR WITHOUT THE USE OF TOILET CLOSET BOLTS", filed Sep. 16, 2014, which is incorporated by reference herein and made part of the present U.S. Utility Patent Application for all purposes.

TECHNICAL FIELD

Embodiments described herein relate generally to securing clamps, and in particular to clamps for securing the base of a toilet to the floor without the need for toilet closet bolts. Further embodiments relate to securing the base of a toilet to the floor utilizing toilet closet bolts. Yet further embodiments related to securing the base of a toilet to the floor while significantly reducing the chance of cracking base of the toilet with the tightening of the clamp.

BACKGROUND

Traditionally toilets are secured to the floor using two toilet closet bolts, one on either side of the toilet, whereby the bolts are secured to the floor flange and extend upward through corresponding bolt openings on each side of the base of the toilet. Washers and nuts are then placed onto each of the bolts, whereby the nuts are tightened, and thereby securing base of the toilet in place. One of the problems with this method of securing the toilet is that the nuts can be easily over tightened, which often results in the cracking or breaking of the toilet bowl base. When this occurs, the entire toilet will need to be replaced.

Another problem with this method is that over time these closet bolts often need to be replaced, such as when the bolts corrode, when the home owner needs or desires to replace the toilet, or, when repairing an existing toilet that is leaking around the base.

Toilet closet bolts are labor intensive and time consuming to replace, in part, because the entire toilet needs to be removed from the bolts and set aside. First, the toilet bolt caps that cover each of the closet bolts must be removed. The nuts from each of the toilet closet bolts then need to be loosened and removed. Often, the nuts are rusted onto the bolts, whereby the bolts need to be cut off. Then, the toiled is removed from the bolts and set aside. The old wax ring is scraped from the floor flange to be able to access the bolts. The floor flange is then removed from the floor opening. Then the nuts and washers holding the original closet bolts in the flange need to be removed. New bolts are then inserted into the flange and need to be properly aligned with the location of the original closet bolts. Once aligned, the new bolts are secured to the flange with washers and nuts. A new wax ring and the flange are then installed around the floor opening. The toilet bowl is then lifted and set into place over the newly installed closet bolts. Nuts are then placed one each of the closet bolts and tightened. As can be appreciated this is very labor intensive and time consuming and usually a two person job.

As can be appreciated, a device is needed that can secure a toilet to the floor without breaking or cracking the toilet, and yet can be quickly installed, or replaced by an individual saving hours of labor and time.

BRIEF DESCRIPTION OF THE SEVERAL VIEWS OF THE DRAWINGS

FIG. 1 illustrates a rear perspective view of a toilet secured to a floor utilizing various embodiments of toilet clamps in accordance with the present invention;

FIG. 2 illustrates a perspective view of two embodiments of toilet clamps as similarly shown in FIG. 1 in accordance with the present invention;

DETAILED DESCRIPTION OF THE INVENTION

Figure 3:
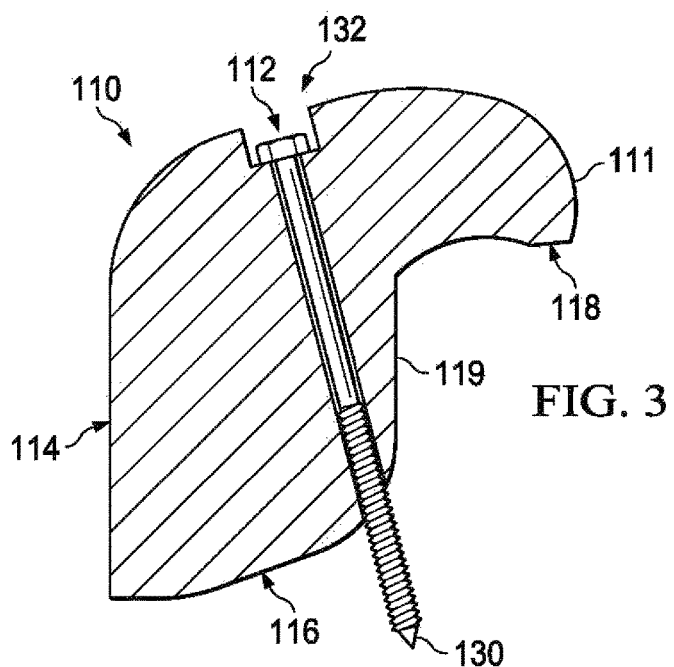
FIG. 3 illustrates a cross sectional view of an embodiment of a toilet clamp in accordance with the present invention.

Referring now to the drawings, wherein various elements depicted are not necessarily drawn to scale and wherein, through the views and figures, like elements may be referenced with identical or similar reference numerals, there is illustrated various embodiments of toilet clamps for securing or anchoring a toilet to a floor.

As seen in FIG. 1, there is illustrated a rear perspective view of a toilet 100 secured in place utilizing a single screw toilet clamp 110 and multi-screw toilet clamps 120. It is contemplated to be within the scope of this invention that as few as one clamp could be used, one clamp per side could be used per, or various combinations of multiple clamps could be used, depending on a user's needs, preferences, including the size and design of the toilet and the type of flooring to which it is to be secured.

Referring now to FIGS. 2 and 3, with FIG. 2 illustrating two embodiments of toilet clamps 110 and 120 and FIG. 3 illustrating a cross-section view of toilet clamp 110. Clamp 110 includes a generally solid body 111 that includes a single predrilled hole 112, a top surface 114, a recessed portion 132 positioned near and below top surface 114, a floor engagement portion 116, a toilet base engagement portion 118, and an intermediate portion 119 which transitions the bottom portion of clamp 110 between the floor engagement portion 116 and toilet base engagement portion 118. The top surface 114 is convex or partial ball-like in shape and extends between the toilet base engagement portion 118 and the floor engagement portion 116. It is contemplated that the toilet base engagement portion 118 could be made of various materials as well as shaped to facilitate optimal engagement with the shape of the portion of the toilet 100 that the clamp 110 will be in contact with. This includes shaping at least a portion of the toilet base engagement portion 118 to a match the base of the toilet 100 for which it will engage. Similarly, the floor engagement portion 118 could be made of various materials as well as shaped to facilitate optimal engagement with the surface of the floor on which it will be placed. As illustrated in this particularly embodiment, the floor engagement portion 118 has a generally flat or planar portion that then extends in a generally curved intermediate portion 116 to toilet base engagement portion 118. The amount of surface area of toilet base engagement portion 118 that engages with the toilet 100 is of a width and depth to spread the force of the clamping on the toilet out so as to substantially inhibit the cracking or breaking of the toilet when clamp 110 is installed.

Clamp 120 includes a generally solid body 121 and includes two predrilled holes 122 and 123, a top surface 124, recessed portions 132 positioned near and below top surface 124, a floor engagement portion 126, toilet base engagement portion 128, and an intermediate portion 129 which transitions clamp 120 between the floor engagement portion 126 and toilet base engagement portion 128. The top surface 124 is partial ball-like in shape and extends between the toilet base engagement portion 128 and the floor engagement portion 126. As with clamp 110, it is contemplated that for clamp 120, the toilet base engagement portion 128 could be made of various materials as well as shaped to facilitate optimal engagement with the shape of the portion of the toilet 100 that the clamp 120 will be in contact with. This includes shaping at least a portion of the toilet base engagement portion 128 to a match the base of the toilet 100 for which it will engage. Similarly, the floor engagement portion 128 could be made of various materials as well as shaped to facilitate optimal engagement with the surface of the floor on which it will be placed. The amount of surface area of toilet base engagement portion 128 that engages with the toilet 100 is of a width and depth to spread the force of the clamping on the toilet out so as to substantially inhibit the cracking or breaking of the toilet when clamp 120 is installed. Although shown with two predrilled holes 122 and 123, it is contemplated that the number of holes used as well as the overall width of clamp 120 could include 3 or more holes depending on the size of the clamp and upon a user's preference.

The top surfaces 114 and 124 of the toilet clamps 110 and 120 are smooth, rounded and shaped to facilitate the runoff of liquids to at least help keep the toilet clamps clean once installed, and to further facility safety around the toilet by reducing possibility of stubbing one's toe, or by substantially preventing the cutting or catching of one's hand when cleaning around the toilet. The thickness of each of the toilet clamps is such to enable each of the predrilled holes 112, 122 and 123 of clamps 110 and 120 to be angled in a manner such that when the clamps 110 and 120 are properly installed, the holes 112, 122 and 123 are oriented at an angle between being perpendicular to the floor and being parallel to the floor (see by way of example FIGS. 3-6) and to ensure that that the screw will go into the floor at an appropriate angle so as to pull the clamp properly toward the toilet to thereby securely hold the clamp to the toilet and floor.

For the operation of toilet clamp 110, toilet 100 is properly aligned and placed over the wax ring and floor opening. Toilet clamp 110 is place proximate the toilet 100 such that toilet base engagement portion 118 is over and engages the base of toilet 100 the floor engagement portion 116 is proximate to and engages the floor upon which the toilet 100 is placed. Once properly aligned or positioned, a screw 130 is driven through hole 112 and driven into the floor thereby securing clamp 110 to the floor and toilet and thereby securing the toilet to the floor. The angle of the predrilled hole 112 ensures the clamp can be pulled tight to both the floor and the toilet 100 ensuring optimal securement.

Similarly, for the operation of toilet clamp 120, toilet 100 is properly aligned and placed over the wax ring and floor opening. Toilet clamp 120 is place proximate the toilet 100 such that toilet base engagement portion 128 is over and engages the base of toilet 100 the floor engagement portion 126 is proximate to and engages the floor upon which the toilet 100 is placed. Once properly aligned or positioned, a screw is driven through each of the holes 122 and 123, with each screw 130 being driven into the floor thereby securing clamp 120 to the floor and toilet and thereby securing the toilet to the floor. The angle of the predrilled holes 122 and 123 ensures the clamp is pulled tight to both the floor and the toilet 100.

Subsequent to the installation of toilet clamps 110 and 120, the top of each of the predrilled holes 112, 122 and 123 can be capped or filled with material such as a caulk sealant for esthetic reasons as well to prevent liquids and caustic cleaning materials from entering into the holes thereby protecting the screws.

Figure 4:
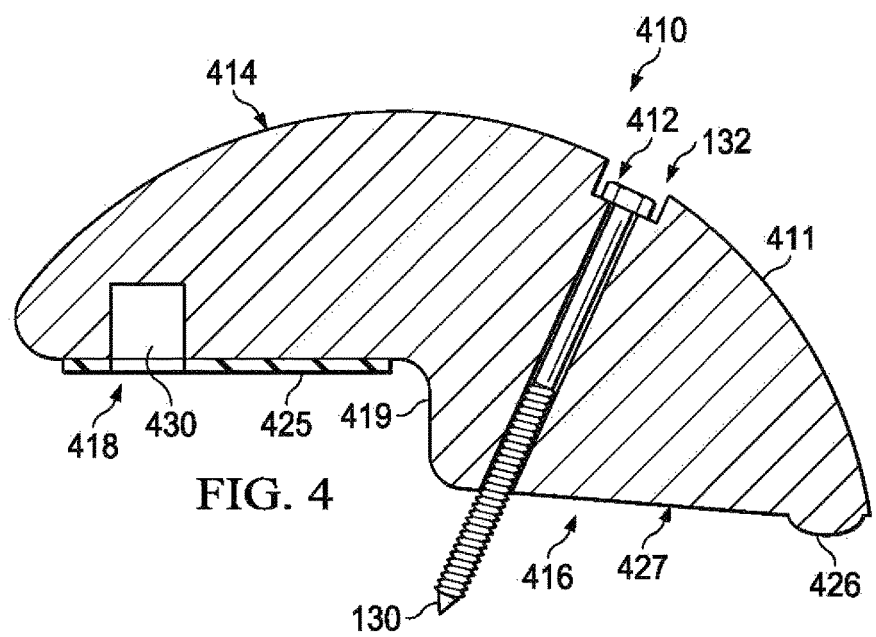
FIG. 4 illustrates a cross sectional view of another embodiment of a toilet clamp in accordance with the present invention.

Referring now to FIG. 4, there is illustrated a cross-sectional view of an alternative embodiment of a toilet clamp 410. Clamp 410 includes a generally solid body 411 and includes a predrilled hole 412 for receiving therein a screw 130, a top surface 414, a recessed portion 132 positioned near and below top surface 414, a floor engagement portion 416, a toilet base engagement portion 418, and an intermediate portion 419 which transitions the bottom portion of clamp 410 between the floor engagement portion 416 and toilet base engagement portion 418. The top surface 414 is partial ball-like in shape and extends between the toilet base engagement portion 418 and the floor engagement portion 416. It this embodiment the toilet base engagement portion 418 is generally planar and includes attached thereto a non-slip material 425, such as, but not limited to rubber, to further secure clamp 410 to the toilet to which it is connected. Although illustrated on the generally planar surface of the toilet base engagement portion 418 it is contemplated that the non-slip material 425 could be utilized on any of the embodiments of the present invention.

The floor engagement portion 418 could be made of various materials as well as shaped to facilitate optimal engagement with the shape and texture of the surface of the floor on which it will be placed. As illustrated in this particularly embodiment, the floor engagement portion 418 has a small hump 426 positioned near the outer perimeter of clamp 410 and a generally flat or planar portion 427. Planar portion 427 can be angled at a slight upward incline, such that when the clamp 410 is installed, and hump 426 engages the floor and the screw is tightened, the slight upward incline of planar portion 427 will not be in contact with the floor, but the clamp will be secured to the floor and toilet. The amount of surface area of toilet base engagement portion 418 that engages with the toilet 100 is of a width and depth to spread the force of the clamping on the toilet out so as to substantially inhibit the cracking or breaking of the toilet when clamp 410 is installed.

Clamp 410 further includes a cavity 430, which can be place over an existing toilet closet bolt. This provides a user the option of not having to remove an existing toilet closet bolt prior to the installation of clamp 410. Although illustrated as a cavity, it is contemplated that the cavity 430 could extend all the way through to the top portion of clamp 410.

For the operation of toilet clamp 410, toilet 100 is properly aligned and placed over the wax ring and floor opening. Toilet clamp 410 is placed proximate the toilet 100 such that toilet base engagement portion 418 is over and engages the base of toilet 100 and the hump 426 of floor engagement portion 416 is proximate to and engages the floor upon which the toilet 100 is placed. If needed, cavity 430 of clamp 410 is also aligned with and placed over an existing toilet closet bolt. Once properly aligned or positioned, a screw 130 is driven through hole 412 and driven into the floor thereby securing clamp 410 to the floor and toilet and thereby securing the toilet to the floor. The angle of the predrilled hole 412 ensures the clamp can be pulled tight to both the floor and the toilet 100 ensuring optimal securement.

Figure 5:
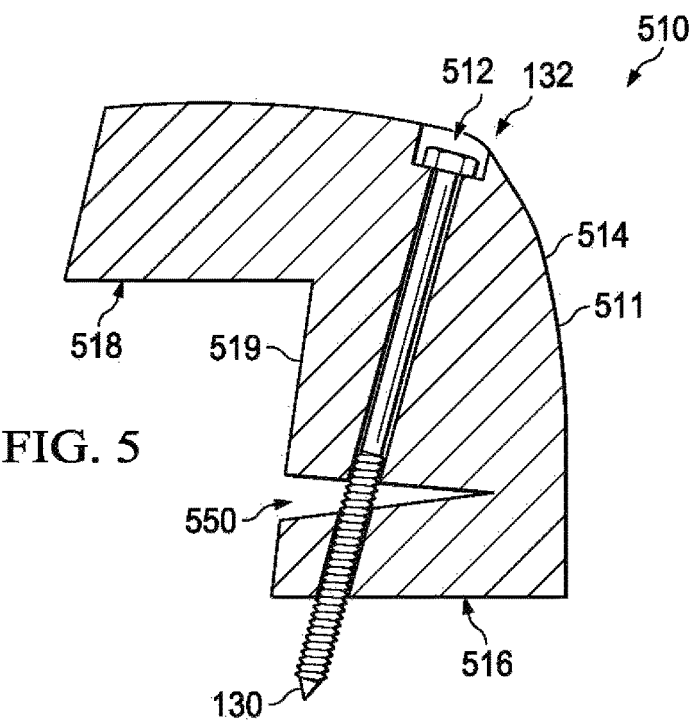
FIG. 5 illustrates a cross sectional view of yet another embodiment of a toilet clamp in accordance with the present invention.

Referring now to FIG. 5, there is illustrated a cross-sectional view of an alternative embodiment of a toilet clamp 510. Clamp 510 includes a generally solid body 511, a predrilled hole 512 for receiving therein a screw 130, a top surface 514, a recessed portion 132 positioned near and below top surface 514, a floor engagement portion 516, a toilet base engagement portion 518, and an intermediate portion 519 which transitions the bottom portion of clamp 510 between the floor engagement portion 516 and toilet base engagement portion 518. Intermediate portion 519 includes a hinge 550 which extends into the body of clamp 510, with the more narrow portion of the hinge 550 being more proximate the outer perimeter of clamp 510 and extending inward and opening up at the intermediate portion 519. The compression and expansion of hinge 550 allows for the adjustability of the height of clamp 510 and thereby clamp 510 can accommodate for differing heights of toilets.

For the operation of toilet clamp 510, toilet 100 is properly aligned and placed over the wax ring and floor opening. Toilet clamp 510 is placed proximate the toilet 100 such that toilet base engagement portion 518 is over and engages the base of toilet 100 and the floor engagement portion 516 is proximate to and engages the floor upon which the toilet 100 is placed. Once properly aligned or positioned, a screw 130 is driven through hole 512 and driven into the floor thereby securing clamp 510 to the floor and toilet and thereby securing the toilet to the floor. As the screw 130 is tightened, the hinge 550 will compress allowing for the toilet base engagement portion 518 to properly engage with the toilet, and will allow for the height of intermediate portion 519 to match the height of the base of the toilet where toilet clamp 510 is being installed. The angle of the predrilled hole 512 ensures the clamp can be pulled tight to both the floor and the toilet 100 ensuring optimal securement.

Figure 6:
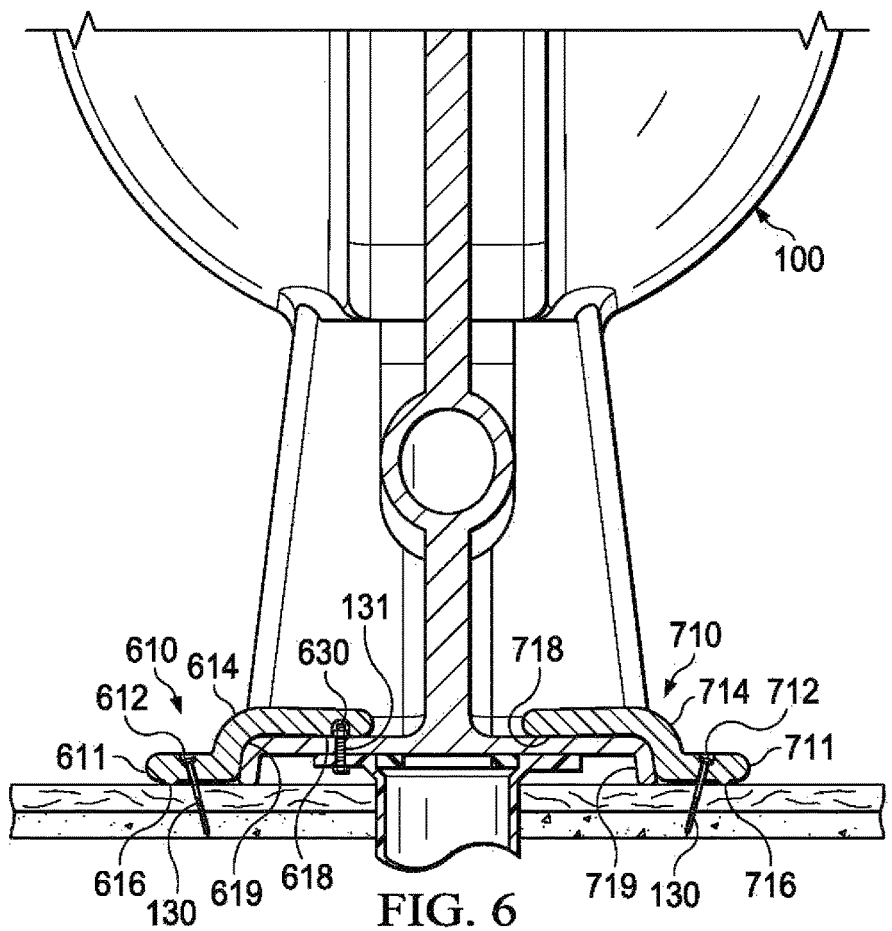
FIG. 6 illustrates a rear cross section view of a toilet secured to a floor utilizing various embodiments of toilets clamps in accordance with the present invention.

Referring now to FIG. 6, there is illustrated a rear cross-sectional view of alternative embodiments of toilet clamps 610 and 710. Clamps 610 and 710 are both generally S-shaped clamps. Clamp 610 includes generally solid body 611, a predrilled hole 612 for receiving therein a screw 130, a floor engagement portion 616, a toilet base engagement portion 618, and an intermediate portion 619 which transitions the bottom portion of clamp 610 between the floor engagement portion 616 and toilet base engagement portion 618. The top surface 614 is generally S-shaped and extends between the toilet base engagement portion 618 and the floor engagement portion 616. Although the toilet base engagement portion 618 is generally planar, it is contemplated that it could be made of various materials as well as shaped to facilitate optimal engagement with the shape of the portion of the toilet 100 that the clamp 610 will be in contact with. This includes shaping at least a portion of the toilet base engagement portion 618 to a match the base of the toilet 100 for which it will engage.

Although floor engagement portion 618 is generally planar, it is contemplated that it could be made of various materials as well as shaped to facilitate optimal engagement with the shape and texture of the surface of the floor on which it will be placed. The amount of surface area of toilet base engagement portion 618 that engages with the toilet 100 is of a width and depth to spread the force of the clamping on the toilet out so as to substantially inhibit the cracking or breaking of the toilet when clamp 610 is installed.

Clamp 610 further includes a cavity 630, which can be place over an existing toilet closet bolt. This provides a user the option of not having to remove an existing toilet closet bolt prior to the installation of clamp 610. Although illustrated as a cavity, it is contemplated that the cavity 630 could extend all the way through to the top portion of clamp 610.

For the operation of toilet clamp 610, toilet 100 is properly aligned and placed over the wax ring and floor opening. Toilet clamp 610 is placed proximate the toilet 100 such that toilet base engagement portion 618 is over and engages the base of toilet 100 and the floor engagement portion 616 is proximate to and engages the floor upon which the toilet 100 is placed. Cavity 630 of clamp 610 is also aligned with and placed over an existing toilet closet bolt 131. Once properly aligned or positioned, a screw 130 is driven through hole 612 and driven into the floor thereby securing clamp 610 to the floor and toilet and thereby securing the toilet to the floor. The angle of the predrilled hole 612 ensures the clamp can be pulled tight to both the floor and the toilet 100 ensuring optimal securement.

Similarly, clamp 710 includes generally solid body 711, a predrilled hole 712 for receiving therein a screw 130, a floor engagement portion 716, a toilet base engagement portion 718, and an intermediate portion 719 which transitions the bottom portion of clamp 710 between the floor engagement portion 716 and toilet base engagement portion 718. The top surface 714 is generally S-shaped and extends between the toilet base engagement portion 718 and the floor engagement portion 716. Although the toilet base engagement portion 718 is generally planar, it is contemplated that it could be made of various materials as well as shaped to facilitate optimal engagement with the shape of the portion of the toilet 100 that the clamp 710 will be in contact with. This includes shaping at least a portion of the toilet base engagement portion 718 to a match the base of the toilet 100 for which it will engage.

Although floor engagement portion 718 is generally planar, it is contemplated that it could be made of various materials as well as shaped to facilitate optimal engagement with the shape and texture of surface of the floor on which it will be placed. The amount of surface area of toilet base engagement portion 718 that engages with the toilet 100 is of a width and depth to spread the force of the clamping on the toilet out so as to substantially inhibit the cracking or breaking of the toilet when clamp 710 is installed.

For the operation of toilet clamp 710, toilet 100 is properly aligned and placed over the wax ring and floor opening. Toilet clamp 710 is placed proximate the toilet 100 such that toilet base engagement portion 718 is over and engages the base of toilet 100 and the floor engagement portion 716 is proximate to and engages the floor upon which the toilet 100 is placed. Once properly aligned or positioned, a screw 130 is driven through hole 712 and driven into the floor thereby securing clamp 710 to the floor and toilet and thereby securing the toilet to the floor. The angle of the predrilled hole 712 ensures the clamp can be pulled tight to both the floor and the toilet 100 ensuring optimal securement.

As described herein, it is contemplated that the present invention can be utilized to secure a toilet to a floor, whether it is being used to repair an existing installed toilet or with a newly installed toilet, it is also contemplated that the present invention could be used in conjunction with regular toilet closet bolts to provide additional holding power and extra strength in securing a toilet to the floor, such as may be the case for toilets utilized in a public setting, or where anticipated users are larger than average or weigh more than average or where a user has a particular disability that causes the user to put more pressure on the toilet when mounting or dismounting the toilet.

It is contemplated to be within the scope of this invention that various features of the particular embodiments disclosed herein are not limited to each particular embodiment, but rather could be combined depending upon a user's need or preference.

It is further contemplated to be within the scope of this invention that the screws or anchor screws described herein could be chosen so that to ensure proper engagement with the floor material, such as, but not limited to wood screws for wood or wood-like floors, and masonry screws for concrete, block, stone or brick floors. Additionally, it is preferred that the diameter and length of the hole to receive the screw be sized in relation to the screw such that the diameter of hole is slightly bigger than the screw and the length of the hole is to facilitate a tight or snug fit to substantially inhibit any movement of the toilet clamp when installed.

As may be used herein, the terms "substantially" and "approximately" provides an industry-accepted tolerance for its corresponding term and/or relativity between items. As may further be used herein, inferred coupling (i.e., where one element is coupled to another element by inference) includes direct and indirect coupling between two items in the same manner as "coupled to". As may be used herein, the term "operable to" indicates that an item performs one or more of the described or necessary corresponding functions and may further include inferred coupling to one or more other items to perform the described or necessary corresponding functions. As may also be used herein, the term(s) "connected to" and/or "connecting" or "interconnecting" includes direct connection or link between items and/or indirect connection between items via an intervening item or items. As may further be used herein, inferred connections (i.e., where one element is connected to another element by inference) includes direct and indirect connection between two items in the same manner as "connected to".

Embodiments have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

What is claimed is:

1. A device for securing a toilet to a floor, comprising:
a body having a top surface and a bottom surface;
the bottom surface including a floor engagement portion for placement proximate to the floor and a toilet engagement portion for placement upon at least a portion of the toilet to be secured to the floor, the toilet engagement portion offset in relationship from the floor engagement portion such that when the floor engagement portion is placed upon the floor, the toilet engagement portion, in relationship to the floor engagement, portion is elevated above and offset therefrom;
a recessed portion positioned proximate to the top surface and positioned below the top surface;
at least one hole extending from the recessed portion through the body, the at least one hole being at an angle between zero and 90 degrees relative to the floor when the device has secured the toilet to the floor, the at least one hole for receiving therein a threaded fastener; and
the complete top surface being spherically shape.

2. The device of claim 1, and including a wedge shaped hinge portion to facilitate compression and expansion of the body;
at least a second hole in axial alignment with the at least one hole to receive therein the threaded fastener to facilitate the compression and expansion of the body.

3. The device of claim 1, and further including a plurality of holes, extending through the body, of the plurality of holes being at an angle between zero and 90 degrees relative to the floor when the device has secured the toilet to the floor, each of the plurality of holes for receiving therein a threaded fastener.

4. The device of claim 1, and further including a non-slip material, the non-slip material being disposed on the toilet engagement portion of the bottom surface.

5. The device of claim 1, wherein the toilet engagement portion includes a cavity for receiving therein a closet toilet bolt.

6. The device of claim 1, and wherein at least a portion of the floor engagement portion is generally planar.

7. The device of claim 6, wherein the floor engagement portion includes a hump extending from an edge of the generally planar floor engagement portion for interfacing with the floor.

8. A clamp for securing a toilet to a floor, comprising:
a body having a top surface and a bottom surface;
the bottom surface including a floor engagement portion for placement proximate to the floor, a toilet engagement portion for placement upon at least a portion of the toilet to be secured to the floor, the toilet engagement portion being offset in relationship to the floor engagement portion such that when the floor engagement portion is placed upon the floor, the toilet engagement portion, in relationship to the floor engagement portion is elevated above and offset therefrom, and an intermediate portion extending between the floor engagement portion and the toilet engagement portion, the intermediate portion offsetting the toilet engagement portion from the floor engagement portion;
a recessed portion positioned proximate to the top surface and positioned below the top surface;
a first hole extending from the recessed portion through the body, the first hole being at an angle between zero and 90 degrees relative to the floor when the device has secured the toilet to the floor, the first hole for receiving therein and guiding there through a threaded fastener;
the intermediate portion including a wedge shaped hinge portion to facilitate compression and expansion of the body; and
a second hole in axial alignment with the first hole to receive therein the threaded fastener to facilitate the compression and expansion of the body.

9. The clamp of claim 8, and further including a non-slip material, the non-slip material being disposed on the toilet engagement portion of the bottom surface.

10. The clamp of claim 8, wherein the toilet engagement portion includes a cavity for receiving therein a closet toilet bolt.

11. The clamp of claim 8, wherein the top surface is spherically shaped.

12. The clamp of claim 11, further including a plurality of holes, extending through the body, each of the plurality of holes being at an angle between zero and 90 degrees relative to the floor when the device has secured the toilet to the floor, each of the plurality of holes for receiving therein a threaded fastener.

13. The clamp of claim 8, and wherein at least a portion of the floor engagement portion is generally planar.

14. The clamp of claim 13, wherein the floor engagement portion includes a hump extending from an edge of the generally planar floor engagement portion for interfacing with the floor.

15. A clamp for securing a toilet to a floor, comprising:
a body having a top surface and a bottom surface, the top surface being spherically shaped;
the bottom surface including a floor engagement portion for placement proximate to the floor, a toilet engagement portion for placement upon at least a portion of the toilet to be secured to the floor, the toilet engagement portion being offset in relationship to the floor engagement portion such that when the floor engagement portion is placed upon the floor, the toilet engagement portion, in relationship to the floor engagement portion is elevated above and offset therefrom, and an intermediate portion extending between the floor engagement portion and the toilet engagement portion, the intermediate portion offsetting the toilet engagement portion from the floor engagement portion;
a plurality of recessed portions, each being positioned proximate to the top surface and positioned below the top surface; and
a plurality of holes, each extending from a corresponding recessed portion through the body, with at least one hole being at an angle between zero and 90 degrees relative to the floor when the device has secured the toilet to the floor, the at least one hole for receiving therein and guiding there through a threaded fastener.

16. The clamp of claim 15, wherein the intermediate portion includes a wedge shaped hinge portion to facilitate compression and expansion of the body.

17. The clamp of claim 16, wherein each of the plurality of holes extend through the body at an angle between zero and 90 degrees relative to the floor when the device has secured the toilet to the floor.

18. The clamp of claim 17, and further including a non-slip material, the non-slip material being disposed on the toilet engagement portion of the bottom surface.

19. The clamp of claim 18, wherein the toilet engagement portion includes a cavity for receiving therein a closet toilet bolt.

* * * * *